United States Patent
Bleiner

[11] Patent Number: 5,923,243
[45] Date of Patent: Jul. 13, 1999

[54] MOTOR VEHICLE COLLISION AVOIDANCE SIGNALLING DEVICE

[76] Inventor: Thomas Bleiner, 4, rue de l'Eglise - MC -98000, Monaco

[21] Appl. No.: 08/682,589
[22] PCT Filed: Dec. 24, 1994
[86] PCT No.: PCT/EP94/04304
    § 371 Date: Jul. 24, 1996
    § 102(e) Date: Jul. 24, 1996
[87] PCT Pub. No.: WO95/20502
    PCT Pub. Date: Aug. 3, 1995

[30] Foreign Application Priority Data

Jan. 29, 1994 [DE] Germany ............. 44 02 661

[51] Int. Cl.⁶ ................................................. B60Q 1/00
[52] U.S. Cl. ..................... 340/435; 340/903; 340/904
[58] Field of Search ..................... 340/435, 436, 340/901, 902, 903, 904; 180/169, 197

[56] References Cited

U.S. PATENT DOCUMENTS

| | | | |
|---|---|---|---|
| 3,868,629 | 2/1975 | Caine | 340/435 |
| 3,949,362 | 4/1976 | Doyle et al. | 340/435 |
| 4,272,800 | 6/1981 | Astourian | 340/435 |
| 4,600,913 | 7/1986 | Caine | 340/435 |
| 5,249,157 | 9/1993 | Taylor | 340/435 |
| 5,298,905 | 3/1994 | Dahl | 342/54 |
| 5,314,037 | 5/1994 | Shaw et al. | 340/903 |
| 5,519,377 | 5/1996 | Murphy | 340/435 |

FOREIGN PATENT DOCUMENTS

| | | |
|---|---|---|
| 3134697 | 3/1983 | Germany . |
| 3728319 | 4/1988 | Germany . |
| 3935001 | 4/1991 | Germany . |
| 4018327 | 12/1991 | Germany . |

*Primary Examiner*—Jeffery A. Hofsass
*Assistant Examiner*—Van T. Trieu
*Attorney, Agent, or Firm*—Evenson, McKeown, Edwards & Lenahan, P.L.L.C.

[57] ABSTRACT

A device for emitting signals from a vehicle indicating the type vehicle, its operating status and a safe following distance to be observed by a following vehicle. For this purpose a laser beam source is mounted preferably at a location on an upper portion of the vehicle which emits the signal. The laser beam generated by the source is directed downward toward the road surface, so that the point of impact is situated at a minimum safe following distance. The point of impact may be adjusted based on vehicle operating parameters, and more than one color or more than one laser source may be used to convey additional information.

15 Claims, 3 Drawing Sheets

MOTOR VEHICLE COLLISION AVOIDANCE SIGNALLING DEVICE

BACKGROUND OF THE INVENTION

The invention relates to a device for giving out signals from a vehicle, in particular to vehicles directly following it, which has at least one light source, arranged detachably or undetachably and rigidly or swivellably on the vehicle, and which emits a visible laser beam.

An optical signalling device is already known from German laid-open specification DE-OS 40 18 327 in which laser beams are emitted, directed vertically upwards from a vehicle for example, in order to make following road users aware of this vehicle. The laser beam is recognizable as a clearly visible line even from a relatively great distance, in particular in unfavorable weather conditions such as in fog, rain and snow. For the safeguarding of, for example, a wide heavy goods vehicle, it is also proposed in this publication to emit from its rear left group of lights a laser beam which travels horizontally rearwards against the direction of travel, diagonally outwards to the edge of the road. As a result, what might be termed a colored luminous guide barrier is produced which is intended to make it easier for following vehicles to overtake the wide vehicle.

Further, through DE-OS 37 28 319, DE-OS 31 34 697 and DE-OS 39 35 001, devices have already become known with which the traffic following a vehicle is informed about the current travel status of the vehicle fitted with the device. To this end, differently colored signalling lights, preferably combined in a group of lights similar to traffic lights, are provided which indicate a certain travel status when they light up. In this way, travel statuses such as for example acceleration, deceleration and non-braking or braking can be signalled. As a rule, a braking operation is indicated by a red light and a green light indicates a non-braking vehicle. Such devices are more favorably mounted in the rear area of the vehicle.

The known optical signalling devices are each limited in their possibilities. The cited optical laser signalling device can only be used for certain situations in addition to those already mentioned, for example for securing the scenes of accidents and indicating direction of travel like an indicator. And the major disadvantage of the device with the differently colored lights for signalling the speed status is that the lights are provided with ordinary bulbs and therefore, in poor visibility, they are possibly recognized by the following vehicle with difficulty and thus maybe too late. On the other hand, it must be expected that, even in good visibility, following road users can be adversely affected through being dazzled by the lights which are often arranged in the rear window. This dangerous dazzling effect has also been established with the use of known rear fog light and braking light systems in the region of the vehicle's rear window.

SUMMARY OF THE INVENTION

It is therefore the object of the invention to provide a device for giving out signals from a vehicle, in particular to vehicles directly following it, which has at least one light source, arranged detachably or undetachably and rigidly or swivellably on the vehicle, which emits a visible laser beam, and which avoids the disadvantages of the known devices. Through the invention it is to be possible, for such a device, above all in unfavorable weather conditions and over a relatively great distance, to signal by a clearly visible, but not dazzling, signal to the following vehicle the safe distance to be observed for example in fog, rain or snow, the device at the same time being usable to give information about the current travel status of the vehicle provided with this device.

This object is achieved according to the invention with a device of the type mentioned above in which the optical axis of the laser beam is always directed rearwards against the direction of travel onto the road in such a way that the resulting distance of the vehicle from the point of impact of the beam on the road corresponds to the safe distance to be observed by a vehicle directly following.

With the device according to the invention, an easily recognizable light beam can be emitted in the form of a laser beam which can penetrate even very moist (for example, foggy) air, over a greater distance compared with the light from conventional bulbs. This laser beam is directed such that it hits the road at a distance behind the vehicle which is calculated in such a way that the point of impact shows the driver of the vehicle directly following the safe distance to be observed.

The driver of the following vehicle therefore no longer needs to determine for himself his distance from the vehicle in front visually or by calculation using the known rule of thumb "safe distance=½speedometer reading", which, particularly in the case of poor visibility conditions, even if it is possible at all, can mean a dangerous distraction. As soon as he has reached with his car that same spot on the road onto which the laser beam is directed, he is situated exactly at the minimum necessary safe distance. If the vehicle closes further on the vehicle in front, the safe distance is no longer observed. However, as long as the driver is still able to see the laser beam along its entire length as far as the point of impact on the road in front of his vehicle, he is a sufficient distance from the vehicle in front.

The laser beam emitted from the light source can be measured in such a way that it does not exert any dangerous or undesired effects on people or other physical objects. This requirement is satisfied for example by a soft laser.

For a following vehicle, it is possible to observe the laser beam emitted by a vehicle in front particularly well when the optical axis of the laser beam is situated approximately in the plane of symmetry formed by the longitudinal axis and the vertical axis of the vehicle, or a parallel plane. The laser beam is then in fact directed rearwards in a straight line onto the road. In the event of too close an approach to the vehicle in front, the laser beam is "driven straight into", so that its point of impact on the road can no longer be seen by the driver of the vehicle directly following.

According to the invention, the device is preferably designed such that the optical axis of the laser beam is directed diagonally downwards onto the road relative to the horizontal plane of symmetry of the same formed by the longitudinal axis and the transverse axis of the vehicle.

The device is expediently mounted in the central region of the vehicle roof facing the rear of the vehicle. In this way, the laser beam is emitted from a comparatively high and thus readily recognizable position on the vehicle. The beam is thus in most cases directed onto the road at a relatively large inclination angle relative to the horizontal plane of symmetry of the vehicle, as a result of which the visibility of the beam is additionally improved. Moreover, its attachment In the central region has a favorable effect on observation of the laser beam's point of impact when travelling around tight bends. As a consequence, this point also then remains on the road as a rule. By positioning the device on the inside of the rear window, it is incidentally better protected against unauthorized access.

By emitting several laser beams showing different colors, information about the travel status of the vehicle emitting the beam is conveyed to the driver of another vehicle in a readily understandable form. A certain travel status is indicated by each color. In addition to recognizing the safe distance, the current travel status of the vehicle in front can thereby at the same time be established constantly. In a traffic situation which is known to arise very often, with a high traffic density and simultaneous thick fog, for example when travelling relatively fast on a motorway, the device can therefore be very helpful. At visibilities up to 50 meters, a red-colored laser beam marking a safe distance of for example 70 meters will require following vehicles to reduce their speed even before they have actually seen the vehicle in front if the red color symbolizes that the vehicle emitting the laser beam is braking. On the other hand, green laser beams indicating for example non-braking vehicles allow these vehicles to be able to travel safely behind one another at sufficient distance, even at reduced visibilities, without having to reduce their speed all that much. It becomes clear, particularly in the latter case, that it is advantageous if all registered vehicles are equipped with the device according to the invention.

For particular vehicles such as for example trucks, buses or vehicles with trailers, it is proposed that the device according to the invention mounted on these has two light sources each emitting at least one laser beam. The two light sources are for example about 10 cm apart and emit differently colored parallel laser beams. One laser beam emitted permanently from the second light source in a uniformly valid particular color can thus serve as a characterizing indication of a special vehicle of this type. Upon observing such a second laser beam in the particular color every following road user then immediately knows that the vehicle in front is one of the special vehicles given by way of example. He is then forewarned and should approach this vehicle with due care. By parallel emission of the laser beams from the two light sources, the beam in the particular color indicating the special vehicle can be seen well and in good time in conjunction with the laser beams containing the other information regarding the travel status of the vehicle.

An intermittent laser beam, i.e. one emitted in pulses or with short breaks, can provide following road users with more information. Such a beam could, similarly to a flashing warning light, indicate a stationary vehicle.

For the emission of pulsating or/and differently colored laser beams, the invention proposes inter alia a pulsed laser generator and a dye laser for the device. Further, the pulsating emission of a laser beam can also be effected simply by regular interruption of the current flow in the light source.

Finally, the invention advantageously proposes that the light source or light sources are arranged swivellably or adjustably movable in order to effect emission of each laser beam at a certain desired inclination angle relative to the road over the required safe distance and laterally at a certain desired angle relative to the vertical plane of symmetry of the vehicle formed by the longitudinal axis and the vertical axis. The device is ideally designed such that it carries out the adjustment movements automatically, taking into consideration for example the route and position of the horizontal vehicle plane of symmetry relative to the horizontal. In this way, each laser beam is then always at the correct distance on the road, corresponding to the safe distance to be observed, behind the vehicle in front emitting the laser beam, even when travelling along roads with humps, dips and bends. Automatic adjustment of the light source(s) can be controlled with the aid of special means. For taking account of stretches of road having dips and humps, this can be a radar device. On the other hand, in order to take account of bends in the road, a steering effect can for example be derived from the steering wheel position of the vehicle carrying the device according to the invention.

It is also conceivable that the device has additional means for determining, from its own speed and the speed of the vehicle directly following, the safe distance that is advisable according to the weather and for moving the optical axis of the laser beam into the appropriate position in each case.

Other objects, advantages and novel features of the present invention will become apparent from the following detailed description of the invention when considered in conjunction with the accompanying drawings.

Figure 1:
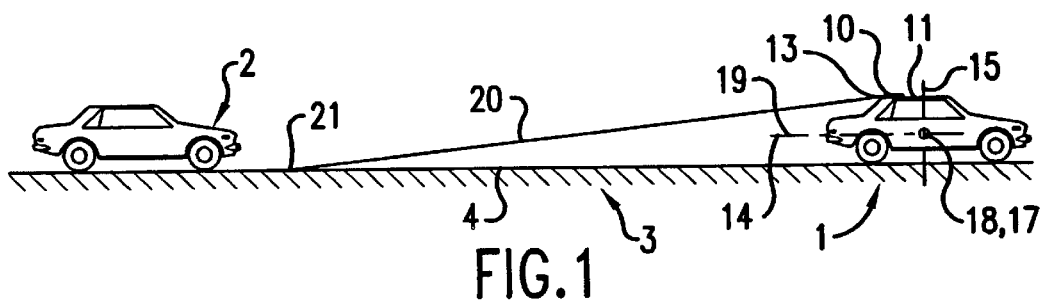
FIG. 1 is a side view of a traffic situation with two cars, in which the car in front is equipped with a device according to the invention mounted on the vehicle roof.
Figure 2:
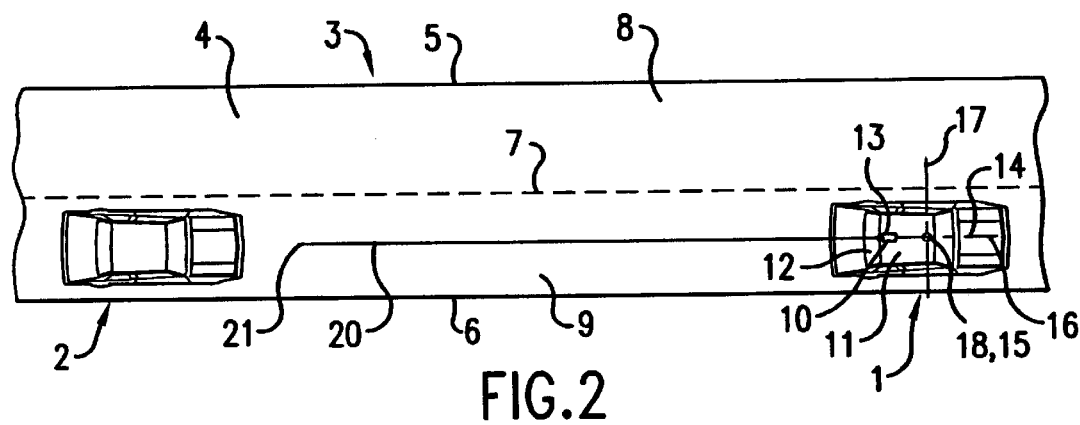
FIG. 2 is a view from above of the traffic situation according to FIG. 1.

DETAILED DESCRIPTION OF THE DRAWINGS:

In the traffic situation shown in FIGS. 1 and 2, two cars 1, 2 are travelling behind one another on a road 3 having a driving surface 4. The driving surface 4 is defined by the left-hand boundary marking 5 and right-hand boundary marking 6 as seen in the direction of travel of the two vehicles 1, 2. The driving surface 4 is also divided into two lanes 8, 9 by a central marker strip, represented here as a broken line. The two vehicles 1, 2 are travelling in the right-hand lane 9.

The car 1 in front is equipped with a device 10 according to the invention which is situated here in the center of the vehicle roof 11 near to the rear window 12. This device 10 and the associated laser light source 13 are thus at the same time situated in a plane of symmetry 16 formed by the longitudinal axis 14 and the vertical axis 15 of the vehicle 1. A horizontal plane of symmetry 19 (perpendicular to the former plane 16) is extended from the longitudinal axis 14 and the transverse axis 17, which like all the aforementioned axes run through the center of gravity 18 of the vehicle 1.

The laser light source 13 emits a readily visible laser beam 20 of a certain color or wavelength along an optical axis. The optical axis of this laser beam 20 is directed rearwards against the direction of travel of the two vehicles and diagonally downwards onto the road relative to the horizontal vehicle plane of symmetry 19. At point 21, the laser beam 20 hits the road 4. This point of impact 21 is situated at a distance (from the vehicle 1 emitting the laser beam) which corresponds precisely to the minimum safe distance to be observed by the following vehicle 2. Since the following vehicle 2 is situated behind the point of impact 21 shown in FIGS. 1 and 2, it is therefore travelling at a sufficient distance from vehicle 1.

Figure 3:
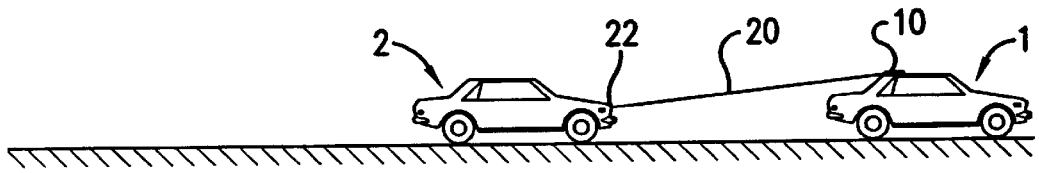
FIG. 3 is a side view of a traffic situation with two cars as in FIG. 1, in which the following vehicle is not positioned at the necessary safe distance from the vehicle in front.
Figure 4:
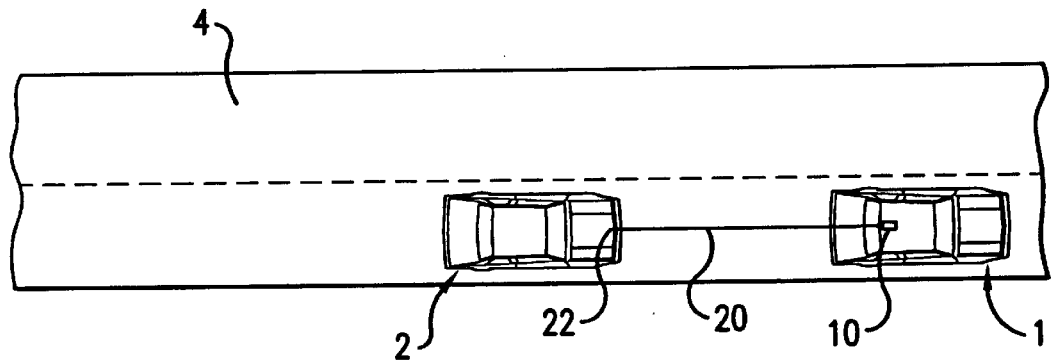
FIG. 4 is a view from above of the traffic situation according to FIG. 3.

By way of contract, FIGS. 3 and 4 show the situation which results when the vehicle 2 has closed on the vehicle 1 in front of him. The result of this close approach to the vehicle 1 is that vehicle 2 "drives straight into" the laser beam 20. The point of impact of the laser beam 20 is no longer on the road 4, but is now situated at a position 22 on the front part of vehicle 2. The required safe distance is no longer ensured.

As soon as the driver in vehicle 2 can no longer see the laser beam 20 along its entire length as far as the point of impact on the road 4, he should reduce the speed of his vehicle 2, particularly in poor visibility, in order to restore the safe distance.

Figure 5:
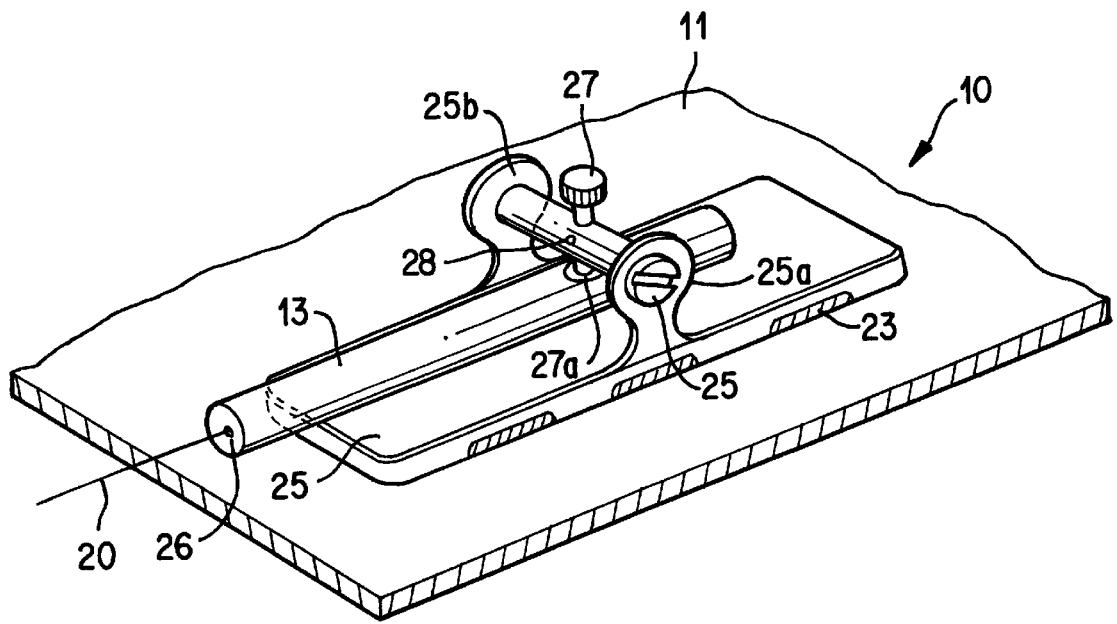
FIG. 5 shows an embodiment of a device mounted on a vehicle roof in perspective view.

FIG. 5 shows a version of the device 10 according to FIGS. 1 to 4. In this case, the device 10 is secured to the vehicle roof 11 by magnets 23, i.e. detachably, only a section being represented here to enable the device 10 to be seen more clearly. For emitting the laser beam 20, the device 10 contains the laser light source 13 whose current supply can be via a battery and is not shown here in more detail. The laser beam 20 emerges from the light source 13 at the opening 24.

The light source 13 is arranged in a holding part 25 such that it, and thus also the optical axis of the laser beam 20, can be swivelled, by a height-adjustment screw 26 which is housed in bearing parts 25a, 25b of the holding part 25 to which the light is connected. In this manner, the light source can be swivelled into the desired direction (in each case onto the road), and held there. This swivel movement takes place with the formation of an angle between the optical axis of the laser beam 20 and the horizontal plane of symmetry 19 of the vehicle formed by the longitudinal axis 14 and the transverse axis 17, cf. FIG. 2.

For the purpose of connecting the light source 13 to the height-adjustment screw 26 and laterally swivelling it (and the optical axis of the laser beam 20), the light source 13 is secured to the lower end 27a of a lateral adjustment bolt 27. This lateral adjustment bolt 27 extends through the height-adjustment screw 26 in its middle region and at a right angle to its axis. Fixing the lateral-adjustment bolt 27 and thus the light source 13 in the desired position is possible using grub screw 28 which also extends through the height-adjustment screw 26. The lateral swivelling of the light source 13 takes place with the formation of an angle between the optical axis of the laser beam 20 and the vertical plane of symmetry 16 of the vehicle formed by the longitudinal axis 14 and the vertical axis 15, cf. FIG. 1.

The two adjustment possibilities, height and lateral adjustment, allow the light source 13 and the optical axis of the laser beam 20 to be precisely adjusted, so that the laser beam 20 is emitted in the required direction. Alternatively, an adjustment mechanism would also be realizable in which the light source 13 is housed in ball-and-socket mode (not shown), in order to align it vertically and laterally.

Figure 6:
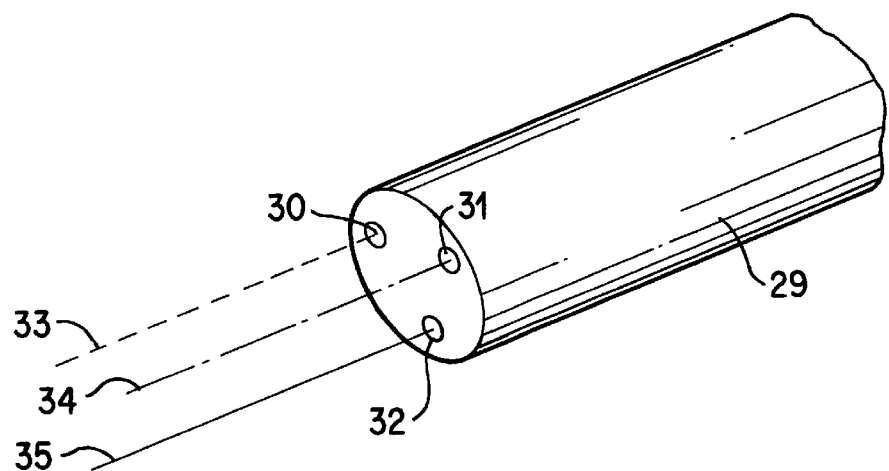
FIG. 6 is a perspective view of a light source according to the invention for emitting three laser beams.

The laser light source 29 according to FIG. 6 has three openings 30, 31 and 32, each for a laser beam 33, 34 and 35 of a certain color. The emission of three differently colored laser beams 33, 34 and 35 that is possible with this version can be realized if three suitably designed laser generators, which are not shown in more detail, are present in the light source 28. Accordingly, each laser generator produces one special laser beam 33, 34 and 35 which is then emitted through the associated opening 30, 31 and 32.

Instead of a laser light source 29 from which three differently colored laser beams are emitted, a so-called dye laser (not shown) can however also be used, with which a broad-band laser beam having a certain wavelength range can be emitted. With dye lasers, instead of the mirror, otherwise used with lasers, which is semi-pervious for the emerging laser beam, a so-called diffraction grating is incorporated. By changing the position of the grating, a wavelength can then be filtered out from the emitted range as a laser beam of a certain color. Thus, when using a dye laser as light source, a single opening suffices for the respective differently colored laser beams.

A specific message relating to the travel status of the vehicle on which the corresponding light source 29 is mounted can thus be assigned to each laser beam 33, 34 and 35 together with the associated color. For example, a green beam 33 can indicate a vehicle travelling at undiminished speed. A red beam 34 can in turn indicate a vehicle travelling at reduced speed, i.e for example a braking one. Finally, a stationary vehicle can be signalled to other road users using a yellow laser beam 35.

Figure 7:
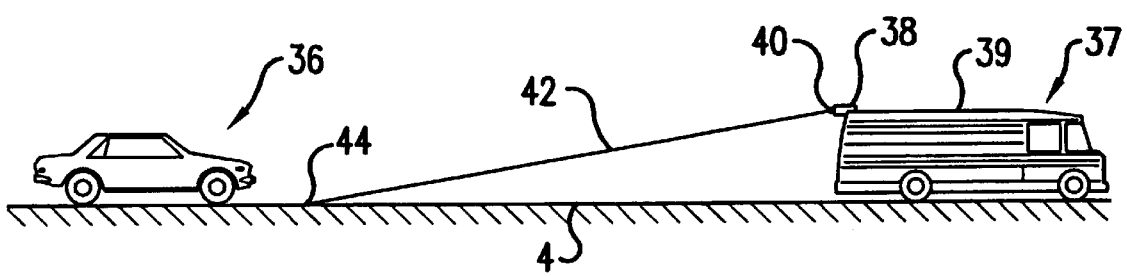
FIG. 7 is a side view of a traffic situation as in FIG. 1, in which the vehicle in front is a truck which is also provided with a device mounted on the vehicle roof.
Figure 8:
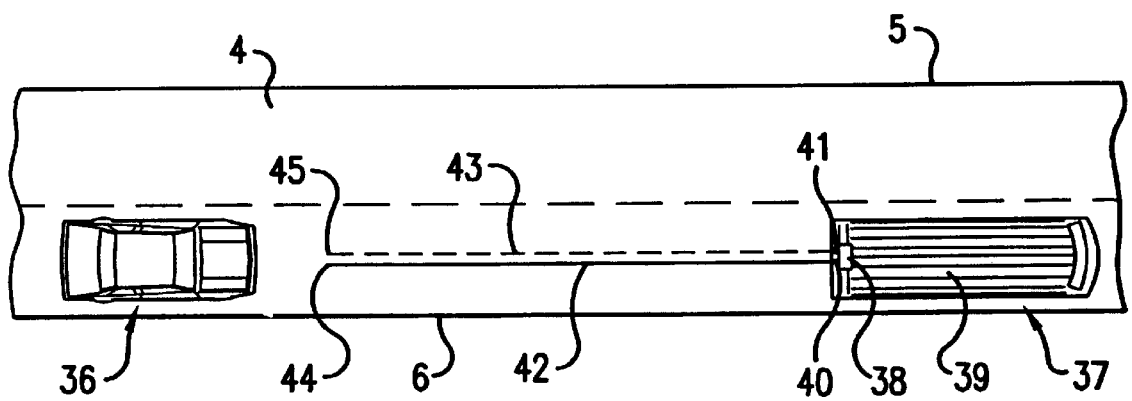
FIG. 8 is a view from above of the traffic situation according to FIG. 7.

A further version of the invention emerges from FIGS. 7 and 8. These two drawings are analogous to FIGS. 1 and 2 respectively. In the traffic situation shown, however, the vehicle 37 in front of vehicle 36 on the road 4 is a van or truck. The truck 37 is equipped with a special version of the device 38 according to the invention, which is mounted on the rear end in the center of the truck roof 39.

The special feature of this device 38 compared with the device according to FIGS. 1 to 4 is that it contains two light sources 40 and 41 each emitting one laser beam of a certain different color. As can be seen from FIG. 8, the laser beam 42 facing the right-hand driving surface edge marking 6 is emitted from light source 40 and the laser beam 43 facing the left-hand driving surface edge marking 5 is emitted from light source 41. The optical axes of the two beams 42, 43 are directed rearwards at a parallel distance from one another against the direction of travel and diagonally downwards onto the road 4 relative to the horizontal plane of symmetry of the truck 37. This produces an impact point 44 on the road for beam 42 and an impact point 45 for beam 43, provided the car 36 is travelling at a sufficient distance behind the truck 37.

When the car 36 drives too close to the truck 37, both beams 42, 43 produce the same effect as was described for laser beam 20 with reference to FIGS. 3 and 4. In the case of the two laser beams 42, 43, the driver of the following vehicle 36 has however already been made aware by the characteristic color of the laser beam 43 that the truck 37 in front is a special vehicle and thus has been given an early reminder of the need for particular care when he approaches it.

Instead of the light source 40 shown in FIGS. 7 and 8, which emits only one laser beam 42 of a certain color, in the case of the truck 37, a light source 29 according to FIG. 6 or a dye laser can also be provided in order to inform the driver of the car 36 about the travel status of the truck 37.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A vehicle signaling device, comprising:
   at least one light source adapted to emit at least one highly collimated laser beam of visible light;
   a mounting device adapted for mounting said at least one light source on a vehicle and for directing said at least one laser beam in a rearward direction relative to a direction of travel of the vehicle, which rearward direction can be varied relative to a longitudinal axis of the vehicle; and
   means for adjusting said direction of said laser beam to a direction which impinges on a traveled road surface creating a preset light pattern at a distance behind the vehicle which is approximately equal to a safe distance to be observed by a following vehicle.

2. Device according to claim 1, wherein the optical axis of the at least one laser beam is situated approximately in a plane of symmetry formed by longitudinal and vertical axes of the vehicle, or in a plane parallel to this the plane of symmetry.

3. Device according to claim 1 wherein the optical axis of the at least one laser beam is directed diagonally downwards onto the road relative to a horizontal plane of symmetry formed by the longitudinal axis and transverse axes of the vehicle.

4. Device according to claim 1, wherein said at least one light source is mounted in a middle region of a roof of said vehicle facing rearward, or in a middle region of an inside of a rear window of the vehicle.

5. Device according to claim 1, wherein the at least one light source comprises a pulsed laser generator for the intermittent emission of at least one laser beam.

6. Device according to claim 1, wherein the optical axis of the at least one laser beam can be adjusted by a swivel movement of the at least one light source by an angle relative to a horizontal plane of symmetry of the vehicle formed by longitudinal and transverse axes thereof.

7. Device according to claim 6, further comprising control means for automatically adjusting the at least one light source, so that the at least one laser beam hits the road at a distance which corresponds to a safe distance behind the car in front, including when a route followed by the vehicle bends and deviates from the horizontal.

8. Device according to claim 1, wherein the optical axis of the at least one laser beam can be adjusted by a swivel movement of the at least one light source by an angle relative to a vertical plane of symmetry of the vehicle formed by longitudinal and vertical axes thereof.

9. The vehicle signalling device according to claim 1, wherein said at least one light source is mounted detachably on said vehicle.

10. The vehicle signalling device according to claim 1, wherein said at least one light source is swivellably mounted on said vehicle.

11. The vehicle signalling device according to claim 1, wherein said at least one light source comprises a source for generating a soft laser beam.

12. A vehicle signaling device, comprising:
   at least one light source adapted to be mounted on a vehicle for emitting at least one laser beam of visible light;
   wherein an optical axis of said at least one laser beam is continuously directed rearwards relative to a forward traveling direction of the vehicle, and downwardly;
   wherein a point of impact of the at least one laser beam on a road surface on which the vehicle travels is situated at distance behind the vehicle which is approximately equal to a safe distance to be observed by a following vehicle; and
   wherein said at least one light source emits a plurality of differently colored laser beams.

13. Device according to claim 12, wherein each of said at least one light source comprises a number of laser generators which corresponds to the number of laser beams to be emitted.

14. Device according to claim 12, wherein each of said at least one light source has a dye laser which permits the emission of differently colored laser beams.

15. A vehicle signaling device, comprising:
   at least one light source adapted to be mounted on a vehicle for emitting at least one laser beam of visible light;
   wherein an optical axis of said at least one laser beam is continuously directed rearwards relative to a forward traveling direction of the vehicle, and downwardly;
   wherein a point of impact of the at least one laser beam on a road surface on which the vehicle travels is situated at distance behind the vehicle which is approximately equal to a safe distance to be observed by a following vehicle; and
   wherein said at least one light source comprises two light sources, each emitting at least one laser beam, which light sources are distanced from one another and emitted differently colored parallel laser beams.

\* \* \* \* \*